United States Patent
Aso et al.

(10) Patent No.: US 10,259,314 B2
(45) Date of Patent: Apr. 16, 2019

(54) FUEL TANK SYSTEM

(71) Applicant: TOYOTA JIDOSHA KABUSHIKI KAISHA, Toyota-shi, Aichi-ken (JP)

(72) Inventors: Shuichi Aso, Toyota (JP); Shinsuke Kinoshita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 361 days.

(21) Appl. No.: 15/350,955

(22) Filed: Nov. 14, 2016

(65) Prior Publication Data

US 2017/0151867 A1 Jun. 1, 2017

(30) Foreign Application Priority Data

Dec. 1, 2015 (JP) .................. 2015-235195

(51) Int. Cl.
*B01D 19/00* (2006.01)
*B60K 15/035* (2006.01)
*B60K 15/03* (2006.01)

(52) U.S. Cl.
CPC .... *B60K 15/03504* (2013.01); *B01D 19/0063* (2013.01); *B60K 15/03519* (2013.01); *B60K 2015/0321* (2013.01); *B60K 2015/0358* (2013.01); *B60K 2015/03514* (2013.01); *B60K 2015/03566* (2013.01); *B60K 2015/03571* (2013.01)

(58) Field of Classification Search
None
See application file for complete search history.

(56) References Cited

U.S. PATENT DOCUMENTS

| 4,817,576 | A | * | 4/1989 | Abe ................ B60K 15/03504 123/516 |
| 5,277,168 | A | | 1/1994 | Kondo et al. |
| 5,868,119 | A | | 2/1999 | Endo et al. |
| 8,622,088 | B2 | * | 1/2014 | Sugiura ................. F16K 1/443 137/630 |
| 2015/0143996 | A1 | * | 5/2015 | Kimoto ............. B01D 53/0454 96/114 |

FOREIGN PATENT DOCUMENTS

| JP | H04-108034 A | 4/1992 |
| JP | H05-254352 A | 10/1993 |
| JP | H10-318065 A | 12/1998 |
| JP | 2011-012615 A | 1/2011 |

* cited by examiner

*Primary Examiner* — Amber R Orlando
*Assistant Examiner* — Phillip Y Shao
(74) *Attorney, Agent, or Firm* — Oliff PLC (57) ABSTRACT

A fuel tank system 12 includes: a communicating pipe 30 that has plural open portions 54A and 54B positioned higher than a full level inside a fuel tank 14 and communicates the inside of the fuel tank 14 with a canister 32; and a valve member 42 that is disposed outside the fuel tank 14 and, on the basis of a state of inclination of fuel detected by a fuel inclination sensor 60, closes the communicating pipe corresponding to an open portion predicted to be positioned in the fuel and opens the communicating pipe corresponding to an open portion predicted to be positioned in a gas layer section.

9 Claims, 10 Drawing Sheets

FUEL TANK SYSTEM

CROSS-REFERENCE TO RELATED APPLICATION

This application claims priority under 35 USC 119 from Japanese Patent Application No. 2015-235195, filed on Dec. 1, 2015, the disclosure of which is incorporated by reference herein in its entirety.

FIELD

Preferred embodiments relate to a fuel tank system.

BACKGROUND

Japanese Patent Application Laid-open (JP-A) No. H5-254352 discloses a fuel outflow prevention device for a vehicle fuel tank having a structure where a float valve and a fuel outflow prevention valve are disposed inside a gas chamber in a fuel tank and where an evaporation passage communicated with the outflow prevention valve is opened and closed by an electromagnetic valve.

In the technology disclosed in JP-A No. H5-254352, during refueling, the electromagnetic valve is closed. Because of this, when the fuel level reaches a full level, the float valve becomes closed and the evaporation passage becomes cut off, so the gas chamber becomes tightly closed to thereby prevent overfill when the fuel tank is full.

Then, when refueling is completed, the electromagnetic valve is opened so that the fuel outflow prevention valve communicates the gas chamber to a canister, so the pressure of the gas chamber inside the fuel tank is maintained equal to or lower than a fixed pressure. Additionally, when the vehicle becomes inclined or overturns, the float valve and the fuel outflow prevention valve become closed to thereby stop fuel outflow from the fuel tank.

In the structure disclosed in JP-A No. H5-254352, a valve having a float (the float valve that regulates the full level or the fuel outflow prevention valve) is disposed in open portions (sections opening to the inside of the fuel tank) of the evaporation passages. Because of this, when the fuel is inclined, the valve having the float becomes immersed in the fuel to ensure that liquid fuel does not move from a communicating pipe to the canister.

In the structure disclosed in JP-A No. H5-254252, by ensuring that the fuel outflow prevention valve does not become immersed in the fuel inside the fuel tank even in a state in which the fuel surface is inclined, the gas in the gas chamber (gas layer) can be moved to the canister to prevent an excessive increase in the internal pressure of the fuel tank. However, the valve having the float has a predetermined height, so when the liquid level when the fuel surface is inclined is set lower than this valve, the full level also becomes set low. For this reason, the inside of the fuel tank cannot be effectively used to increase the effective capacity of the fuel tank (the amount of fuel that the fuel tank can hold).

In consideration of the circumstances described above, an object of the present disclosure is to make it possible for the gas to move from the fuel tank to the canister when the fuel surface in the fuel tank is inclined and to ensure a large effective capacity for the fuel tank.

SUMMARY

A fuel tank system of a first aspect includes: a fuel tank that holds fuel; a canister that adsorbs fuel vapor; a communicating pipe that has plural open portions positioned higher than a full level inside the fuel tank and communicates the inside of the fuel tank with the canister; a fuel inclination sensor that detects a state of inclination of a fuel surface with respect to the fuel tank; and a valve member that is disposed outside the fuel tank and, on the basis of the state of inclination detected by the fuel inclination sensor, closes the communicating pipe corresponding to an open portion, among the plural open portions, predicted to be positioned in the fuel and opens the communicating pipe corresponding to an open portion predicted to be positioned in a gas layer section of the fuel tank.

The fuel inclination sensor detects the state of inclination of the fuel surface with respect to the fuel tank. The valve member, on the basis of the state of inclination of the fuel surface detected by the fuel inclination sensor, closes the communicating pipe corresponding to the open portion, among the plural open portions of the communicating pipe, predicted to be positioned in the fuel and opens the communicating pipe corresponding to the open portion predicted to be positioned in the gas layer section. The communicating pipe corresponding to the open portion predicted to be positioned in the fuel is closed, so movement of the liquid fuel from the communicating pipe to the canister is prevented. The communicating pipe corresponding to the open portion predicted to be positioned in the gas layer section of the fuel tank is opened, so fuel in the gas layer section of the fuel tank is able to move to the canister by means of the communicating pipe.

The valve member is disposed outside the fuel tank, and it is not necessary to dispose inside the fuel tank a float valve for preventing movement of the liquid fuel to the canister when the fuel is inclined. It is not necessary to set the full level low in order to avoid immersion of the float valve in the fuel, so a large effective capacity for the fuel tank (the amount of fuel that the fuel tank can substantially hold) can be ensured.

A second aspect is the fuel tank system of the first aspect, further including: a vapor pipe that has, in a center in a longitudinal direction of the fuel tank as seen in a plan view of the fuel tank, a vapor outlet positioned higher than the full level inside the fuel tank and communicates the inside of the fuel tank with the canister; and a full-tank regulating valve that is disposed in the vapor outlet and closes the vapor outlet by means of a float floating on the fuel inside the fuel tank.

When refueling the fuel tank, the full-tank regulating valve becomes closed when the fuel surface reaches the full level to thereby prevent the gas from moving from the inside of the fuel tank through the vapor pipe to the canister. That is, by disposing the full-tank regulating valve in the vapor outlet of the vapor pipe, a state in which the fuel surface does not go beyond the full level can be reliably realized.

The vapor outlet in which the full-tank regulating valve is disposed is positioned in the center in the longitudinal direction of the fuel tank, so the full-tank regulating valve is also positioned in the center in the longitudinal direction of the fuel tank. Even when the fuel tank is inclined when refueling the fuel tank, the effects of this inclination can be reduced to reduce variations in the amount of fuel inside the fuel tank when the fuel tank is full.

A third aspect is the fuel tank system of the second aspect, wherein the open portions are positioned on edge portion sides of the fuel tank relative to the vapor outlet as seen in a plan view of the fuel tank.

The open portions (in which it is not necessary to dispose a float valve) are positioned on the edge portion sides of the fuel tank, so when the fuel surface is inclined, it is easy to realize a state in which an open portion is positioned in the gas layer section.

Additionally, because when the fuel surface is inclined a state in which an open portion is positioned in the gas layer section is realized, the full-tank regulating valve may be positioned in the fuel. That is, when the fuel surface is inclined, it is not necessary for the full-tank regulating valve to be in the gas layer, and the liquid level can be set high.

A fourth aspect is the fuel tank system of the third aspect, wherein the communicating pipe has a common pipe shared in common on a canister side and plural branch pipes branching on an open portion side.

The communicating pipe is shared in common by the common pipe on the canister side of the branch portion, so compared to a structure where there is a separate communicating pipe for each open portion from the fuel tank to the canister, this can contribute to a reduction in weight and a reduction in the number of parts.

A fifth aspect is the fuel tank system of the fourth aspect, wherein the common pipe also functions as the vapor pipe on the canister side.

That is, the common pipe, which is part of the communicating pipe, also functions as part of the vapor pipe, so compared to a structure where the communicating pipe and the vapor pipe are completely separate, this can contribute to a reduction in weight and a reduction in the number of parts.

A sixth aspect is the fuel tank system of the fifth aspect, wherein the valve member includes: a rotating valve that is disposed in a branch portion of the communicating pipe at which the branch pipes branch and has communicating holes that communicate the common pipe with specific branch pipes among the plural branch pipes in accordance with an angle of rotation of the rotating valve; and a control device that causes the rotating valve to rotate predetermined angles on the basis of the fuel surface detected by the fuel inclination sensor so that the communicating holes communicate the common pipe with the specific branch pipes among the branch pipes.

By simply adjusting the angle of rotation of the rotor, the common pipe can be communicated with specific branch pipes by the communicating holes. The rotor is disposed in the branch portion, and it is not necessary to dispose an opening and closing valve in each of the branch pipes, so this can contribute to a reduction in the number of parts. Furthermore, it suffices for the control device to control the angle of rotation of the one rotor, and the control device does not need to control plural opening and closing valves, so control is easy.

A seventh aspect is the fuel tank system of the sixth aspect, wherein the rotating valve communicates the common pipe with the vapor pipe on a fuel tank side in accordance with the angle of rotation of the rotating valve.

The rotor also opens and closes the vapor pipe, so it is not necessary to dispose a new member (e.g., a valve member) for opening and closing the vapor pipe, and this can contribute to a reduction in weight and a reduction in the number of parts.

An eighth aspect is the fuel tank system of any of the first to seventh aspects, wherein the fuel inclination sensor includes: a vehicle angle-of-inclination sensor that detects an angle of inclination of a vehicle in which the fuel tank is installed; and an acceleration sensor that detects acceleration of the vehicle.

The angle of inclination of the vehicle detected by the vehicle angle-of-inclination sensor and the acceleration of the vehicle detected by the acceleration sensor can be effectively used to detect the state of inclination of the fuel surface. It suffices to use (doubly use), as the vehicle angle-of-inclination sensor and the acceleration sensor, sensors already installed beforehand in the vehicle, and it is not necessary to install a new vehicle angle-of-inclination sensor and acceleration sensor, so this can contribute to a reduction in weight and a reduction in cost.

DESCRIPTION OF EMBODIMENTS

Figure 1A:
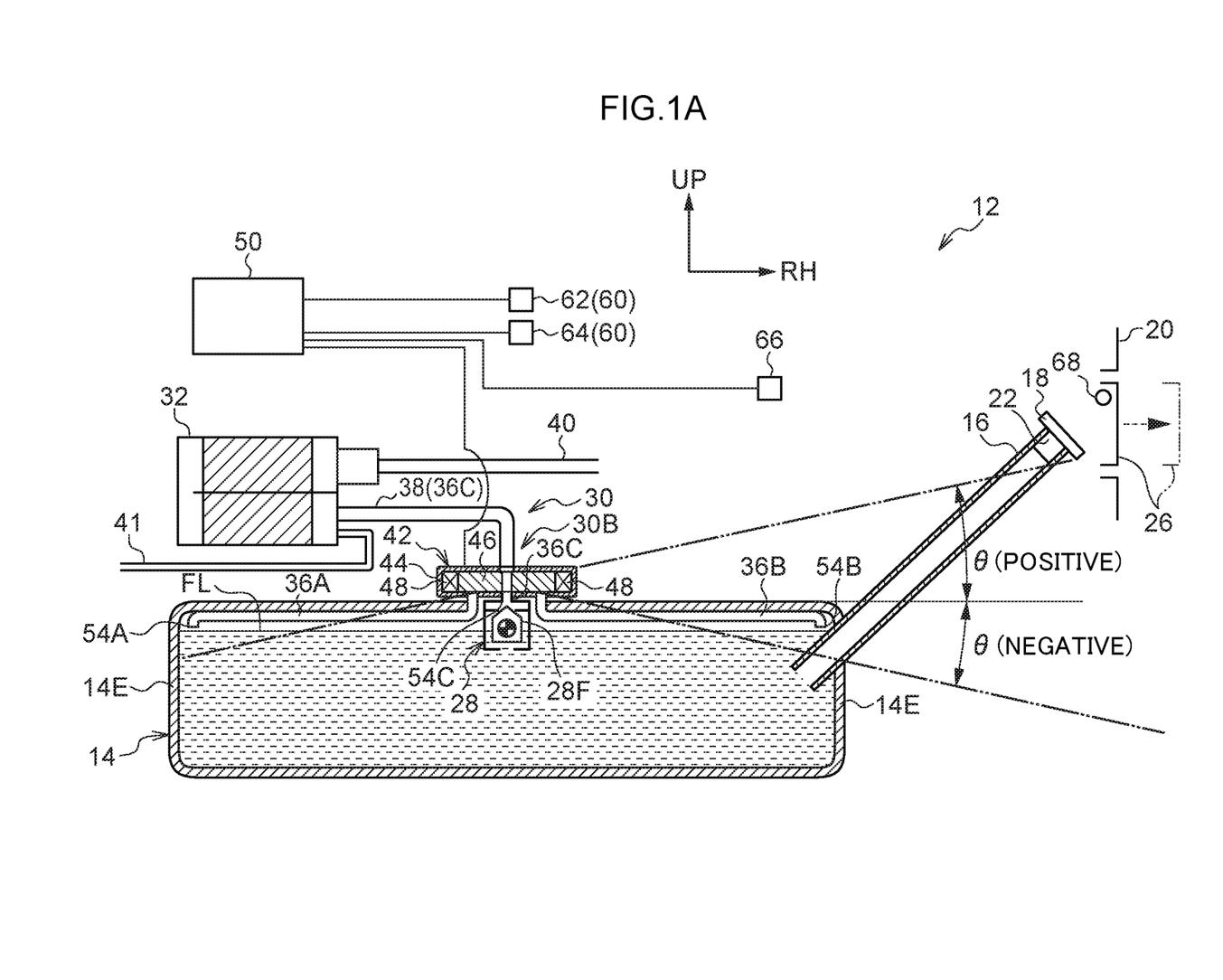
FIG. 1A is a configuration diagram showing a fuel tank system pertaining to an embodiment in a state in which a fuel tank is full and fuel therein is not inclined, with the fuel tank being broken out.
Figure 1B:
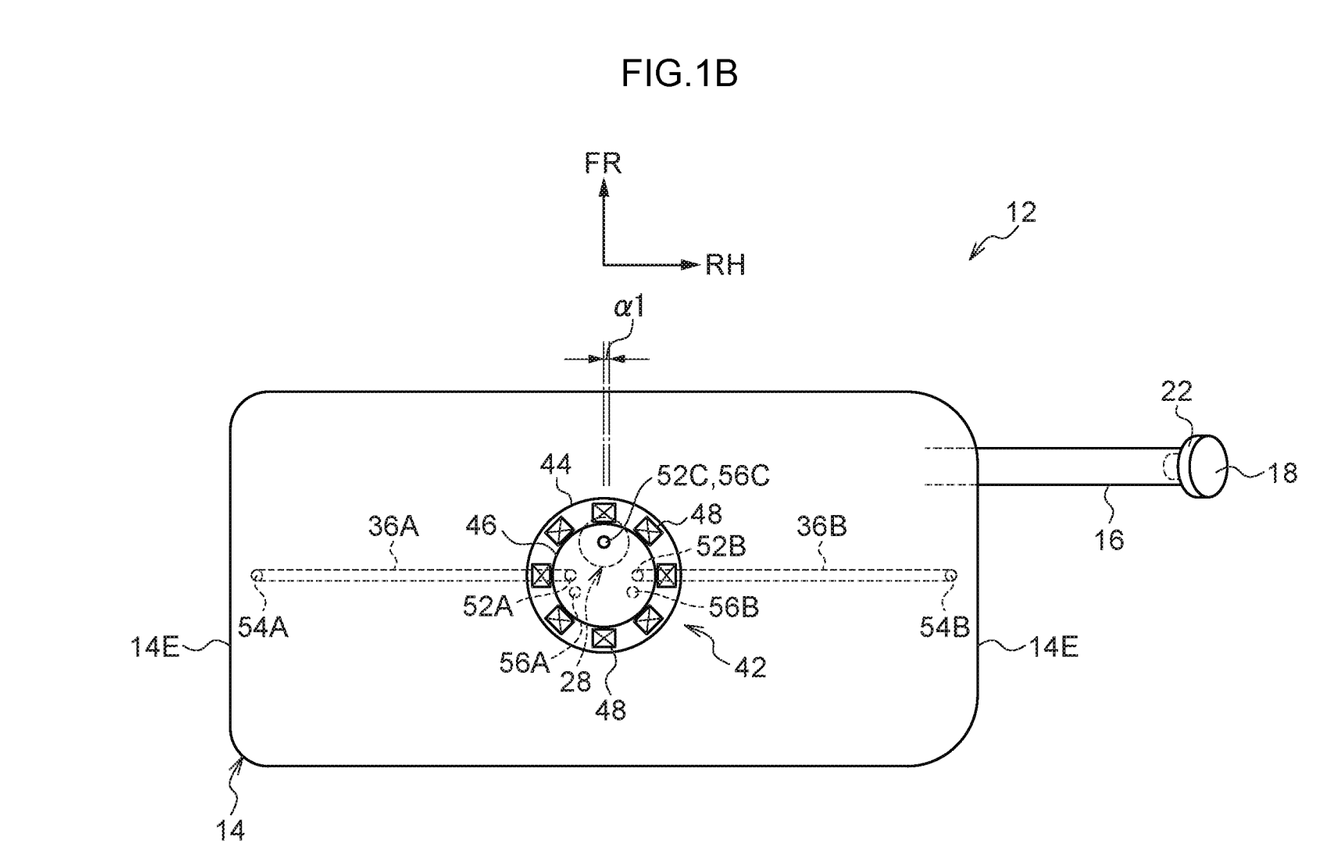
FIG. 1B is a plan view, corresponding to FIG. 1A, showing the fuel tank system pertaining to the embodiment.

FIG. 1A and FIG. 1B show a fuel tank system 12 pertaining to an embodiment. The fuel tank system 12 has a fuel tank 14 capable of holding fuel FE inside.

In the following description, arrow FR indicates the forward direction of a vehicle in which the fuel tank system 12 is installed, arrow RH indicates the vehicle rightward direction, and arrow UP indicates the upward direction.

The fuel tank 14, as shown in FIG. 1B, is formed in a substantially rectangular shape as seen in a plan view. The fuel tank 14 is installed in the vehicle in such a way that the longitudinal direction of the fuel tank 14 coincides with the vehicle width direction (the direction of arrow RH and the opposite direction thereof) and the transverse direction of the fuel tank 14 coincides with the vehicle forward and rearward direction (the direction of arrow FR and the opposite direction thereof).

A filler pipe 16 is connected to the upper portion of the fuel tank 14. An insertion opening 22, into which a fuel nozzle 34 is inserted, is disposed in the upper portion of the filler pipe 16. The insertion opening 22 is closed by a cap 18, and the cap 18 is removed when refueling the fuel tank 14.

A lid 26 is disposed in a panel 20 of the vehicle body. When refueling the fuel tank 14, the lid 26 is opened as indicated by the long dashed double-short dashed line in FIG. 1A so that attachment and removal of the cap 18 and insertion of the fuel nozzle 34 (see FIG. 3A and FIG. 3B) into the insertion opening 22 are possible.

The lower portion of the filler pipe 16 is positioned on the lower side, in the vertical direction, of a later-described full level FL inside the fuel tank 14.

Part of a vapor pipe 36C (the section positioned on the fuel tank 14 side of a later-described rotating electromagnetic valve 42) having a vapor outlet 54C formed in its lower end is placed inside the fuel tank 14. Additionally, a full-tank regulating valve 28 having a float 28F with a lower specific gravity than the fuel (which floats on the fuel) is attached to the vapor outlet 54C. Furthermore, a canister 32 is disposed outside the fuel tank 14.

Figure 3A:
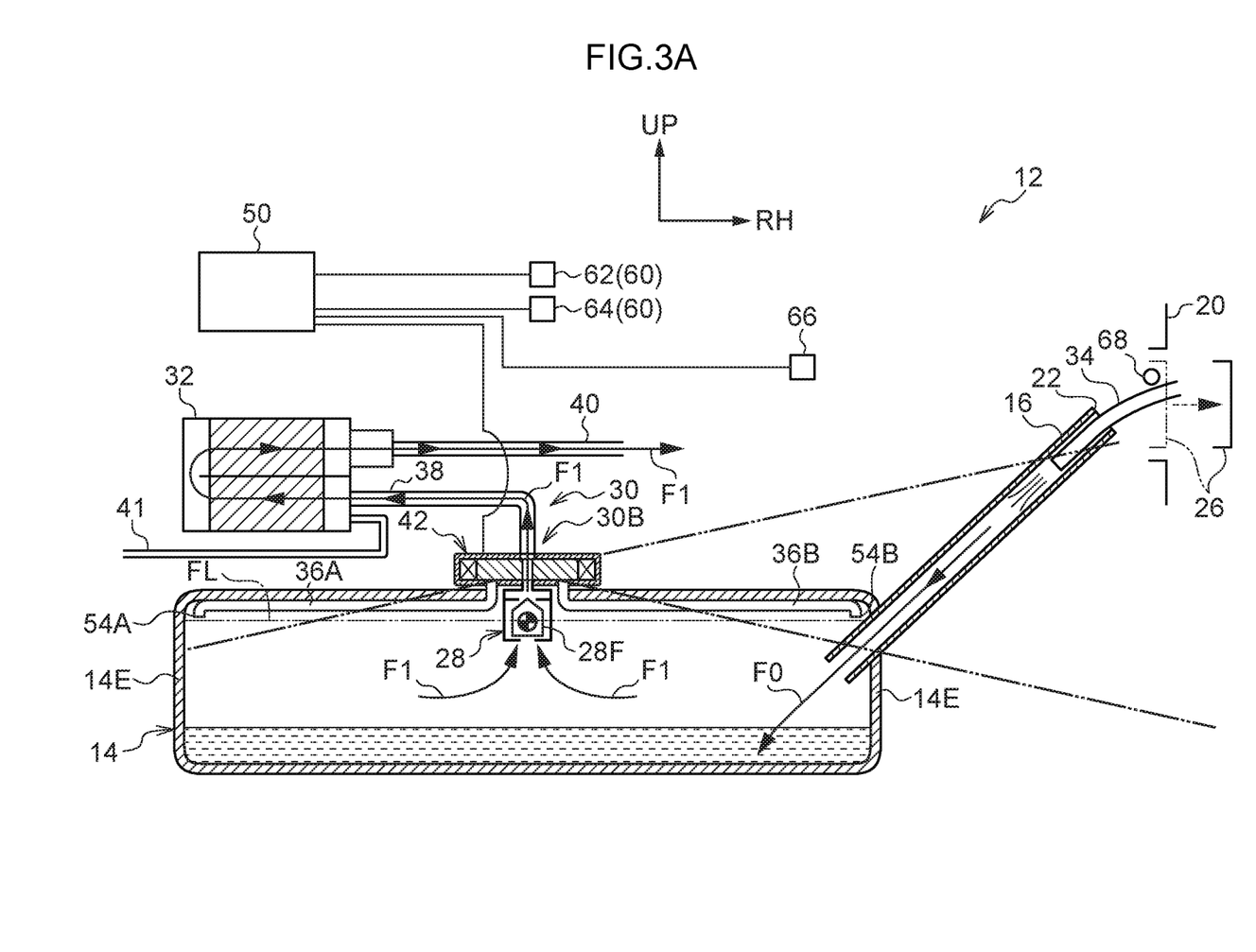
FIG. 3A is a configuration diagram showing the fuel tank system pertaining to the embodiment in a state in which the fuel tank is being refueled and the fuel is not inclined, with the fuel tank being broken out.

As shown in FIG. 3A, in a state in which the float 28F is not floating on the fuel, the full-tank regulating valve 28 is open. In a state in which the full-tank regulating valve 28 is open, gas inside the fuel tank 14 is able to move through a communicating pipe 30 to the canister 32. When the gas inside the fuel tank 14 moves to the canister 32, fuel vapor included in the gas inside the fuel tank 14 is adsorbed by an adsorbent in the canister 32. It should be noted that the section of the inside of the fuel tank 14 above the fuel surface will be called a "gas layer." The gas layer section is a layer in which gas is present. For example, when the fuel surface goes down from the full level FL, the height of the gas layer section becomes higher.

In contrast to this, when the float 28F floats on the fuel (rises) as shown in FIG. 1A in accompaniment with an increase in the liquid level, the full-tank regulating valve 28 becomes closed. When the full-tank regulating valve 28 becomes closed, the gas inside the fuel tank 14 is unable to move to the canister 32. When the fuel tank 14 is filled with more fuel from the fuel nozzle 34 in this state, the fuel with which the fuel tank 14 has been filled collects in the filler pipe 16 and the fuel surface inside the filler pipe 16 rises. Then, when the fuel inside the filler pipe 16 reaches the fuel nozzle 34, the refueling is stopped by an auto stop mechanism in the fuel nozzle 34.

As mentioned above, the section of the vapor pipe 36C positioned inside the fuel tank 14 extends upward from the full-tank regulating valve 28 and is connected to the later-described rotating electromagnetic valve 42. The rotating electromagnetic valve 42 and the canister 32 are connected to each other by a common pipe 38. As described later, when the rotating electromagnetic valve 42 is switched to predetermined states, the full-tank regulating valve 28 is able to be communicated to the canister 32 by the vapor pipe 36C, the rotating electromagnetic valve 42, and the common pipe 38.

One end of an open-to-atmosphere pipe 40 and one end of a purge pipe 41 are connected to the canister 32. The other end of the open-to-atmosphere pipe 40 is open to the atmosphere. The other end of the purge pipe 41 is connected to an engine not shown in the drawings and can allow negative pressure in the engine to act on the canister 32. Because of this negative pressure, atmospheric air is introduced from the open-to-atmosphere pipe 40 and the fuel vapor adsorbed by the adsorbent in the canister 32 is desorbed (purged).

As shown in FIG. 1B, the vapor outlet 54C of the vapor pipe 36C is located in a position in the center in the longitudinal direction (vehicle width direction) of the fuel tank 14 and near the center in the transverse direction, and the full-tank regulating valve 28 is disposed so as to open and close the vapor outlet 54C. That is, the full-tank regulating valve 28 is also placed in a position in the center in the longitudinal direction (vehicle width direction) of the fuel tank 14 and near the center in the transverse direction (vehicle forward and rearward direction) of the fuel tank 14. "Center" here includes a case where it is strictly the center in the longitudinal direction or the transverse direction of the fuel tank 14 as well as a range in which the float 28F reliably rises and closes the full-tank regulating valve 28 because of the risen fuel surface when refueling the fuel tank 14.

The rotating electromagnetic valve 42 is disposed outside the fuel tank 14, in a position near an upper surface 14U of the fuel tank 14 and above the full-tank regulating valve 28.

Figure 2A:
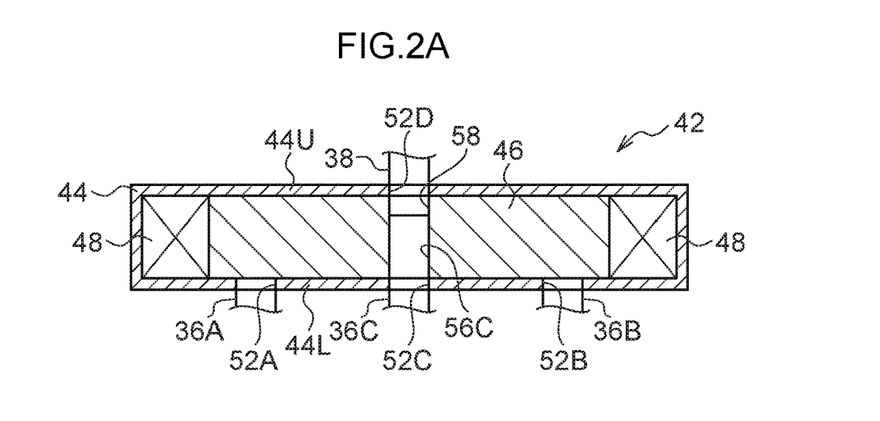
FIGS. 2A to 2C are cross-sectional views, enlarged in the neighborhood of an electromagnetic valve, showing the fuel tank system pertaining to the embodiment.
Figure 2B:
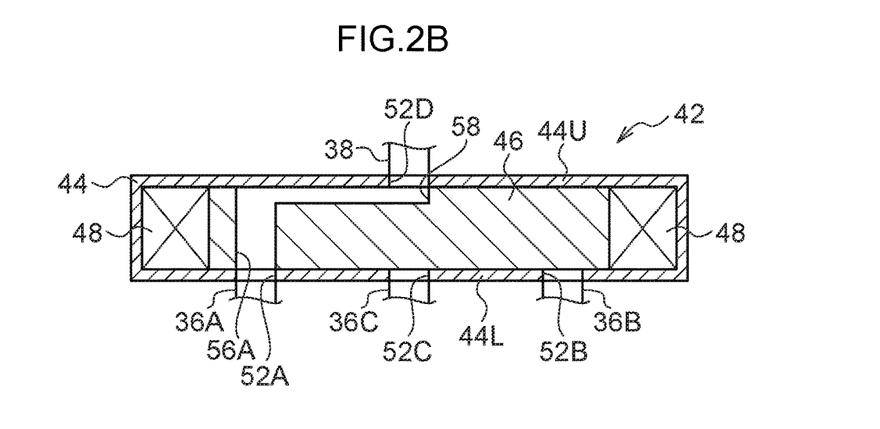
Figure 2C:
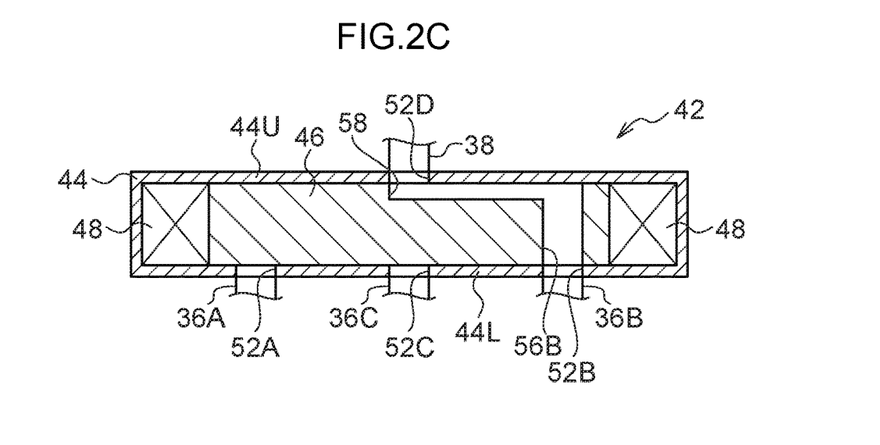

As shown in detail in FIGS. 2A to 2C, the rotating electromagnetic valve 42 has a flat, round tube-shaped rotor housing 44. A rotor 46 is placed inside the rotor housing 44. The rotor 46 is rotated predetermined angles of rotation by plural coils 48 disposed in the rotor housing 44. As shown in FIG. 1A, FIG. 3A, FIG. 4A, and FIG. 5A, the open/closed states of the rotating electromagnetic valve 42 (specifically, the angle of rotation of the rotor 46) are controlled by a control device 50.

As shown in FIG. 1A and FIG. 1B, a pair of branch pipes 36A and 36B are placed inside the fuel tank 14. The branch pipes 36A and 36B each extend substantially parallel to the upper surface 14U along the longitudinal direction of the fuel tank 14 from a position near the center to the neighborhoods of edge portions 14E on both vehicle width direction sides of the fuel tank 14.

Connecting holes 52A, 52B, and 52C are formed in a lower surface 44L (the surface near the fuel tank 14) of the rotor housing 44. One end of the branch pipe 36A and one end of the branch pipe 36B are connected to the connecting holes 52A and 52B, respectively, in the rotor housing 44. Moreover, the upper end of the section of the vapor pipe 36C on the fuel tank 14 side is connected to the connecting hole 52C.

In the present embodiment, the communicating pipe 30 has the common pipe 38 on the canister 32 side and the plural (two) branch pipes 36A and 36B on the fuel tank 14 side. Additionally, the one rotating electromagnetic valve 42 is disposed in a branch portion 30B at which the common pipe 38 branches into the plural branch pipes 36A and 36B.

Moreover, the section of the vapor pipe 36C on the fuel tank 14 side branches from the branch portion 30B. The common pipe 38 doubles as the section of the vapor pipe 36C on the canister 32 side. That is, part of the vapor pipe 36C is shared in common with part of the communicating pipe 30.

As shown in FIG. 1A and FIG. 1B, the other end side of the branch pipe 36A and the other end side of the branch pipe 36B are bent downward, and open portions 54A and 54B are formed in the other ends. That is, the open portions 54A and 54B are spaced apart from each other in the longitudinal direction (vehicle width direction) of the fuel tank 14 and, particularly in the present embodiment, are located in positions close to the edge portions 14E of the fuel tank 14. Furthermore, the positions, in the upward and downward direction, of the open portions 54A and 54B are higher than the full level FL.

As shown in FIGS. 2(A) to 2(C), a common connecting hole 52D is formed in an upper surface 44U (the surface away from the fuel tank 14) of the rotor housing 44. The common pipe 38 is connected to the common connecting hole 52D.

Individual communicating holes 56A, 56B, and 56C corresponding to the connecting holes 52A, 52B, and 52C, respectively, are formed in the rotor 46. The individual communicating holes 56A, 56B, and 56C merge in the upper portion of the rotor 46 to form a common communicating hole 58. The common communicating hole 58 is communicated with the common connecting hole 52D in the upper surface 44U of the rotor housing 44 regardless of the angle of rotation of the rotor 46.

In contrast to this, the positions of the individual communicating holes 56A, 56B, and 56C are decided in such a way that the individual communicating holes 56A, 56B, and 56C become communicated with any of the connecting holes 52A, 52B, and 52C in the lower surface 44L of the rotor housing 44 in accordance with the angle of rotation of the rotor 46.

Figure 3B:
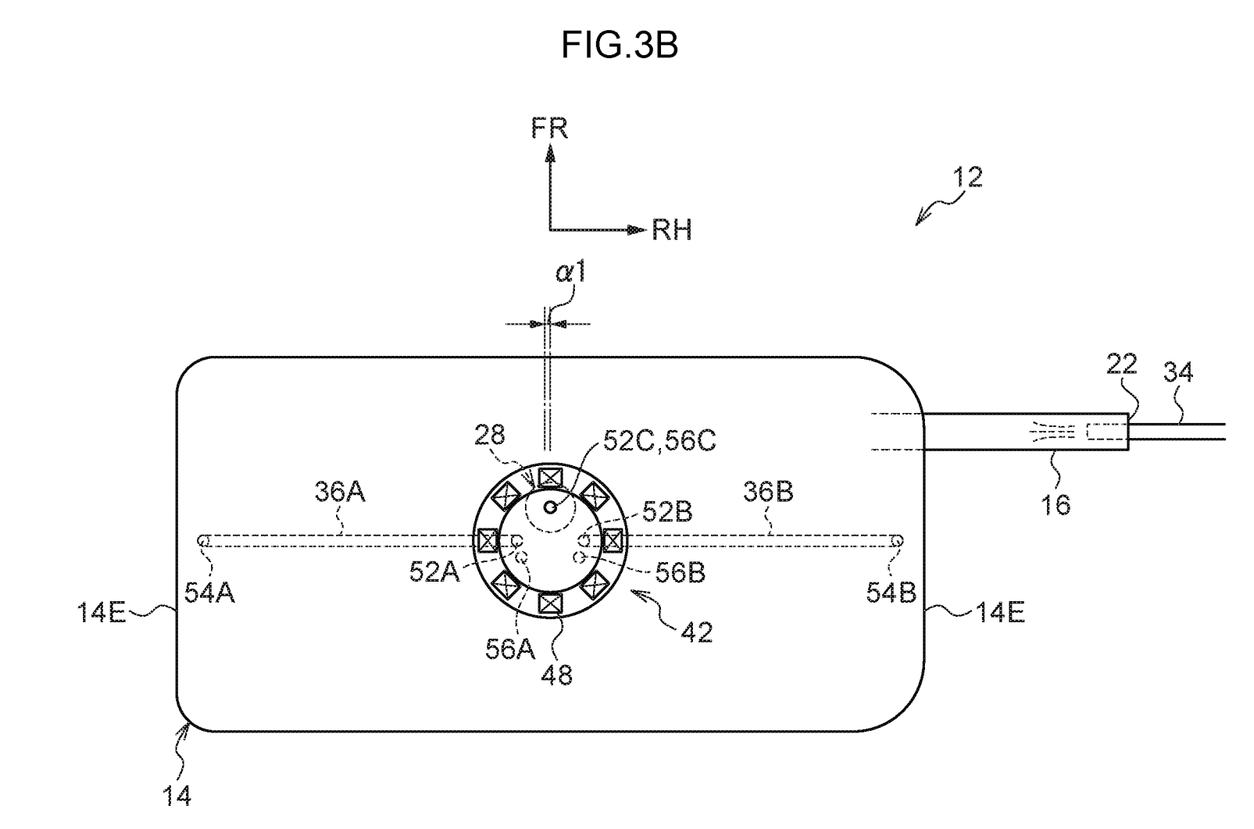
FIG. 3B is a plan view, corresponding to FIG. 3A, showing the fuel tank system of the embodiment.

Specifically, for example, as shown in FIG. 3B, in a state in which the angle of rotation of the rotor 46 is a predetermined angle of rotation α1, the individual communicating hole 56C is communicated with the connecting hole 52C as shown in FIG. 1B and FIG. 2(A). However, the individual communicating hole 56A is not communicated with the connecting hole 52A, and the individual communicating hole 56B is not communicated with the connecting hole 52B. In this state, movement of the gas from the vapor pipe 36C (the section on the fuel tank 14A side) and to common pipe 38 is possible, but movement of the gas from the branch pipes 36A and 36B to the common pipe 38 is blocked.

It should be noted that in FIG. 1B or FIG. 3B the angle of rotation α1 is 0 degrees as a reference of the angle of rotation of the rotor 46.

Figure 4A:
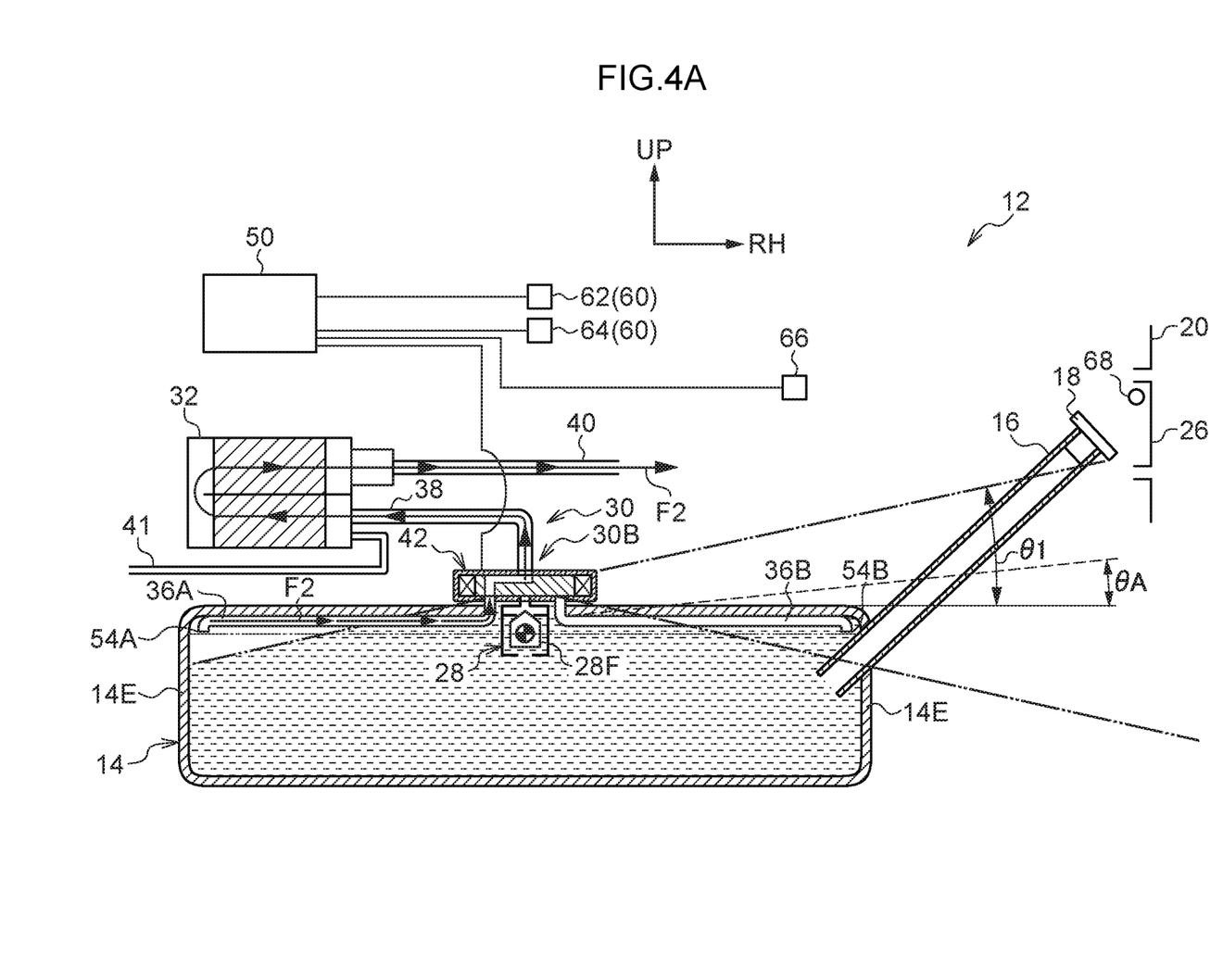
FIG. 4A is a configuration diagram showing the fuel tank system pertaining to the embodiment in a state in which the fuel tank is full and the fuel is inclined, with the fuel tank being broken out.
Figure 4B:
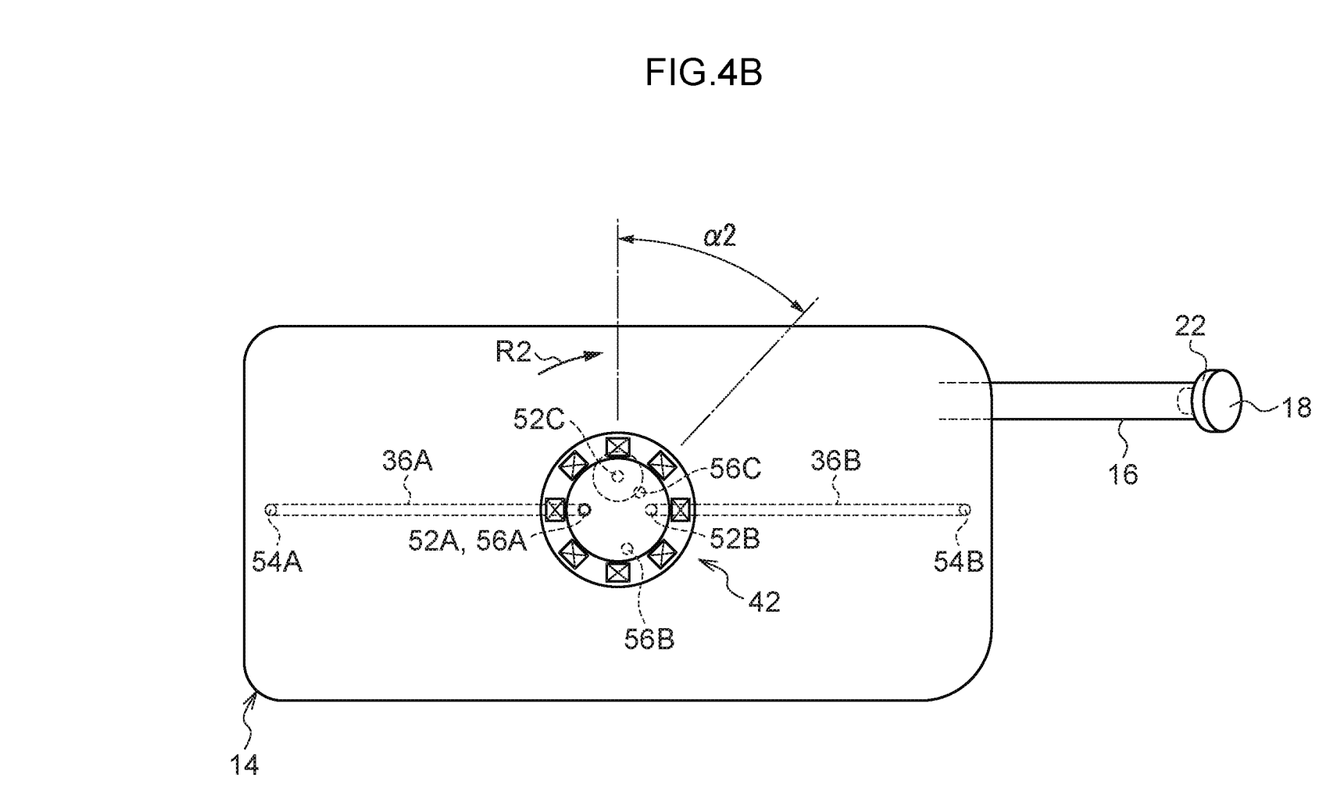
FIG. 4B is a plan view, corresponding to FIG. 4A, showing the fuel tank system of the embodiment.

In contrast to this, as shown in FIG. 4B, when the angle of rotation of the rotor 46 becomes a predetermined angle of rotation α2, the individual communicating hole 56A is communicated with the connecting hole 52A (see FIG. 2(B)), but the individual communicating holes 56B and 56C are not communicated with the connecting holes 52B and 52C, respectively. In this state, movement of the gas from the branch pipe 36A to the common pipe 38 is possible, but movement of the gas from the branch pipe 36B to the common pipe 38 is blocked. Furthermore, movement of the gas through the vapor pipe 36C is also blocked.

Figure 5A:
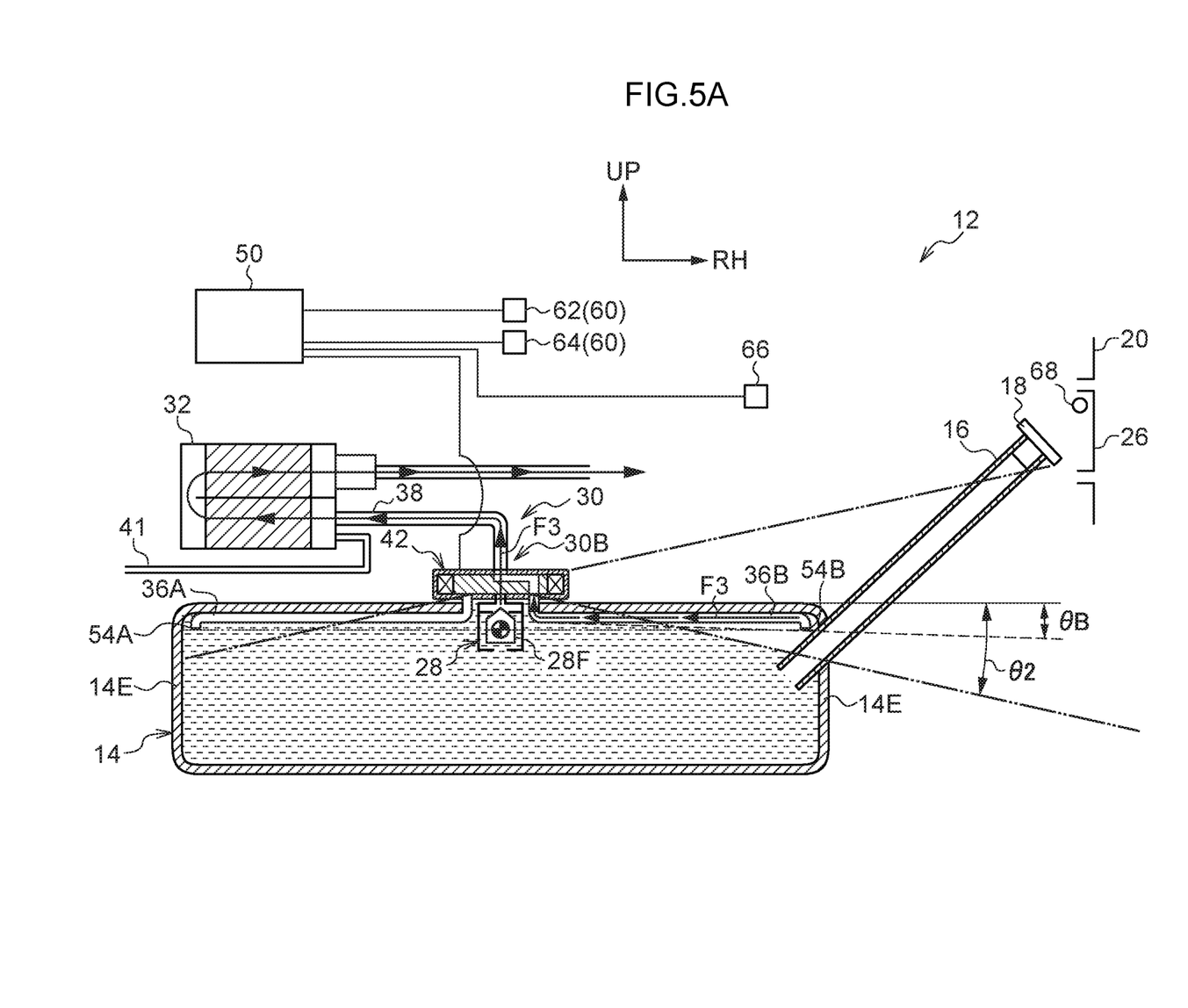
FIG. 5A is a configuration diagram showing the fuel tank system pertaining to the embodiment in a state in which the fuel tank is full and the fuel is inclined, with the fuel tank being broken out.
Figure 5B:
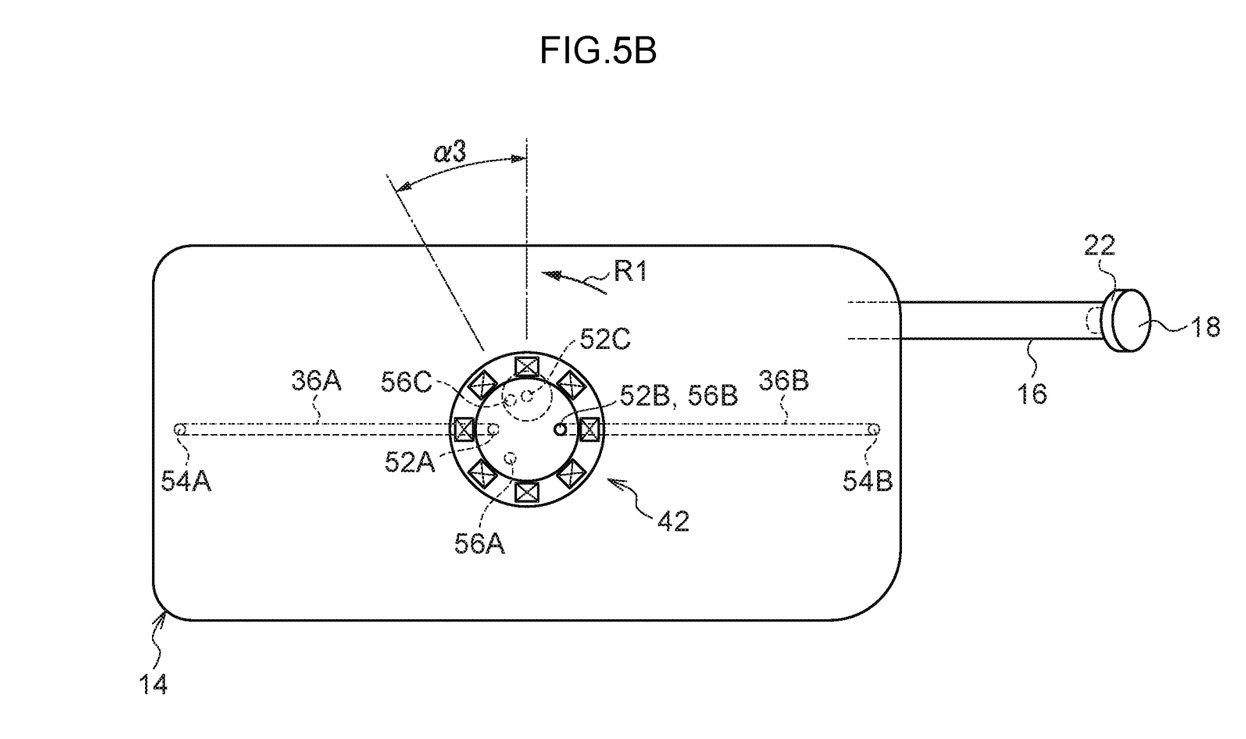
FIG. 5B is a plan view, corresponding to FIG. 5A, showing the fuel tank system of the embodiment.

As shown in FIG. 5B, when the angle of rotation of the rotor 46 becomes a predetermined angle of rotation α3, the individual communicating hole 56B is communicated with the connecting hole 52B (see FIG. 2(C)), but the individual communicating holes 56A and 56C are not communicated with the connecting holes 52A and 52C, respectively. In this state, movement of the gas from the branch pipe 36B to the common pipe 38 is possible, but movement of the gas from the branch pipe 36A to the common pipe 38 is blocked. Furthermore, movement of the gas through the vapor pipe 36C is also blocked.

As shown in FIG. 1A, the vehicle in which the fuel tank 14 is installed has a vehicle angle-of-inclination sensor 62 that detects the angle of inclination of the vehicle and an acceleration sensor 64 that detects acceleration of the vehicle. In the fuel tank system 12, data detected by the vehicle angle-of-inclination sensor 62 and the acceleration sensor 64 are sent to the control device 50. An angle of inclination θ of the fuel surface can be calculated from information obtained by the vehicle angle-of-inclination sensor 62 and the acceleration sensor 64. The vehicle angle-of-inclination sensor 62 and the acceleration sensor 64 are an example of a fuel inclination sensor 60.

It should be noted that sensors installed beforehand in the vehicle can also be doubly used as the vehicle angle-of-inclination sensor 62 and the acceleration sensor 64. The vehicle angle-of-inclination sensor 62 and the acceleration sensor 64 may also be installed as new sensors in the fuel tank system 12.

The vehicle also has a lid switch 66 and a lid sensor 68. Information obtained as a result of the lid switch 66 being operated is sent to the control device 50. When the control device 50 receives this information, the control device 50 unlocks the lid 26. Information about the open/closed state of the lid 26 is sent from the lid sensor 68 to the control device 50. The control device 50 is able to determine that the lid 26 is open to refuel the fuel tank 14.

Next, the action of the present embodiment will be described.

Figure 6:
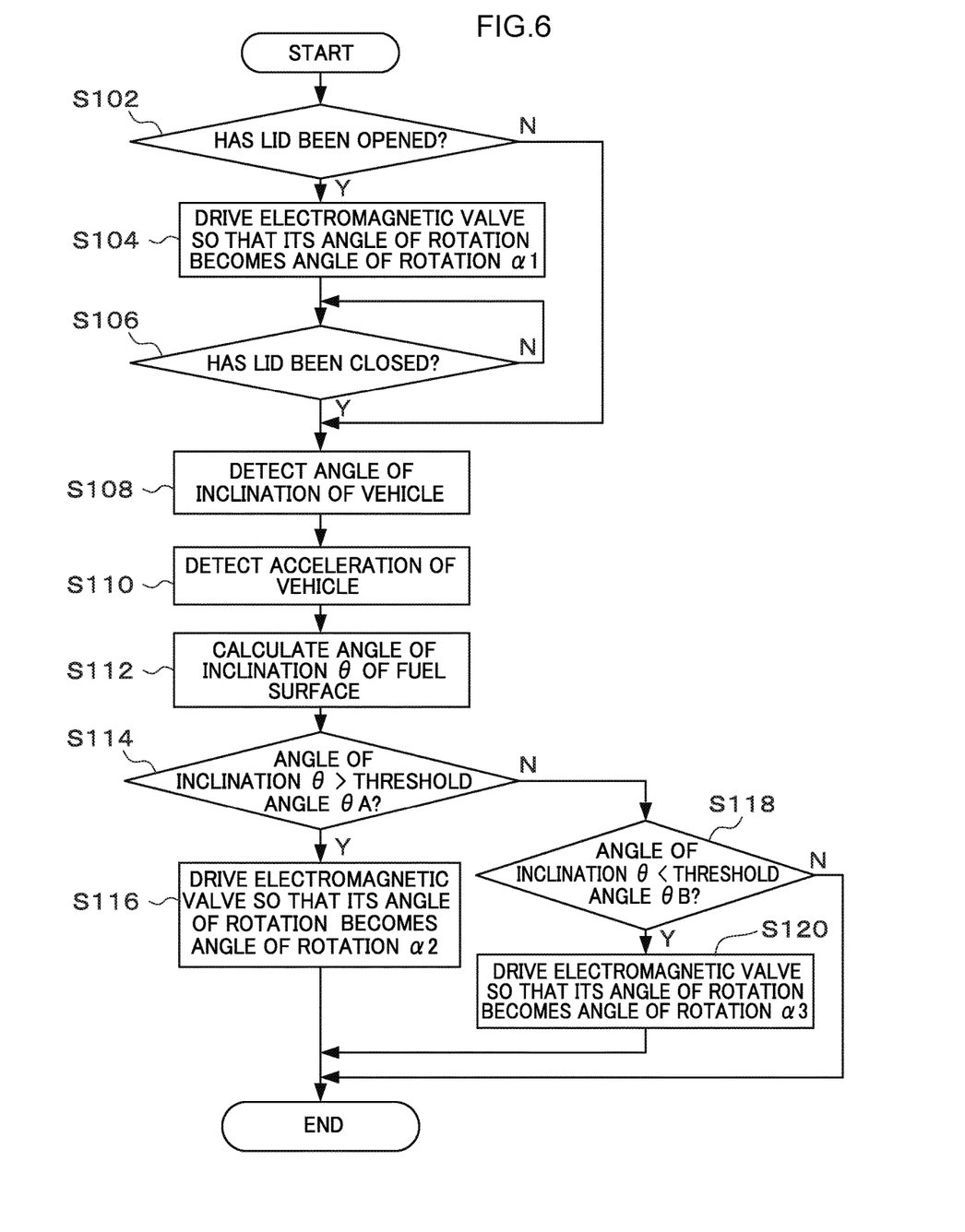
FIG. 6 is a flowchart showing control of an electromagnetic valve in the fuel tank system pertaining to the embodiment.

In the present embodiment, the control device 50 controls the open/closed state of the rotating electromagnetic valve 42 (the angle of rotation of the rotor 46) on the basis of the control flow shown in FIG. 6.

First, in step S102 the control device 50 judges whether or not the lid 26 has been opened. This judgment may be made on the basis of the information obtained as a result of the lid switch 66 being operated or on the basis of the information about the open/closed state of the lid 26 detected by the lid sensor 68.

In a case where the control device 50 has judged in step S102 that the lid 26 has not been opened, the control device 50 moves to step S108. Processes in step S108 and thereafter will be described later.

In a case where the control device 50 has judged in step S102 that the lid 26 has been opened, the control device 50 moves to step S104. In step S104 the control device 50 drives the rotor 46 to rotate so that the angle of rotation of the rotor 46 of the rotating electromagnetic valve 42 becomes the predetermined angle of rotation α1. Because of this, as shown in FIG. 3B and FIG. 2(A), the individual communicating hole 56C is communicated with the connecting hole 52C, but the individual communicating hole 56A is not communicated with the connecting hole 52A, and the individual communicating hole 56B is not communicated with the connecting hole 52B.

In this state the cap 18 is removed by a filling station attendant, for example, and the fuel tank 14 is refueled as indicated by arrow F0 in FIG. 3A. Until the fuel level in the fuel tank 14 reaches the full level FL, the full-tank regulating valve 28 is open. Furthermore, as shown in FIG. 3B, the state in which the individual communicating hole 56C is communicated with the connecting hole 52C is maintained. Consequently, the gas inside the fuel tank 14 moves through the vapor pipe 36C (via the rotating electromagnetic valve 42) to the canister 32 as indicated by arrows F1 in FIG. 3A.

Then, as shown in FIG. 1A, when the fuel level inside the fuel tank 14 reaches the full level FL, the float 28F floats on the fuel and the full-tank regulating valve 28 is closed. In this state also, the individual communicating hole 56A is not communicated with the connecting hole 52A, and the individual communicating hole 56B is not communicated with the connecting hole 52B. That is, the gas inside the fuel tank 14 is unable to move to the canister 32. For this reason, the fuel with which the fuel tank 14 has been refueled collects inside the filler pipe 16 and the fuel surface inside the filler pipe 16 rises. Then, when the fuel inside the filler pipe 16 reaches the fuel nozzle 34, the auto stop mechanism in the fuel nozzle 34 operates so that refueling is stopped.

It should be noted that in this state, as mentioned above, the paths of movement of the gas from the open portions 54A and 54B to the canister 32 are closed by the rotating electromagnetic valve 42. Because the gas in the fuel tank 14 does not move via the branch pipes 36A and 36B to the canister 32, over-refueling of the fuel tank 14 (refueling past the full level FL) can be prevented.

When refueling ends, the cap 18 is reattached by the filling station attendant, for example, and the lid 26 is closed. In step S106 the control device 50 judges whether or not the lid 26 has been closed. In a case where the control device 50 has judged that the lid 26 has not been closed, the control device 50 returns to step S104. In a case where the control device 50 has judged that the lid 26 has been closed, the control device 50 moves to step S108.

In step S108 the control device 50 detects the angle of inclination of the vehicle on the basis of the information from the vehicle angle-of-inclination sensor 62. In step S110 the control device 50 further detects the acceleration of the vehicle on the basis of the information from the acceleration sensor 64. Additionally, in step S112 the control device 50 calculates the angle of inclination θ of the fuel surface inside the fuel tank 14.

It should be noted that in the present embodiment the angle of inclination θ of the fuel surface is the angle of the fuel surface measured using as a reference the fuel surface in a state in which the fuel tank 14 is level and with the counter-clockwise direction in FIG. 1A being positive.

That is, depending on the angle of inclination and the acceleration of the vehicle, there are cases where, for example, as shown in FIG. 4A, the angle of inclination θ becomes an angle of inclination θ1 (a positive value) and the fuel leans rightward in the vehicle width direction. In this case, depending on the position of the fuel level, the open portion 54A of the branch pipe 36A on the left side in the vehicle width direction is positioned in the gas layer inside the fuel tank 14, and the open portion 54B of the branch pipe 36B on the right side in the vehicle width direction and the full-tank regulating valve 28 in the substantial center in the vehicle width direction are positioned in the liquid fuel.

There are also cases where, as shown in FIG. 5A, conversely from the state shown in FIG. 4A, the angle of inclination θ becomes an angle of inclination θ2 (a negative value) and the fuel leans leftward in the vehicle width direction. In this case, depending on the position of the fuel level, the open portion 54B of the branch pipe 36B on the right side in the vehicle width direction is positioned in the gas layer inside the fuel tank 14, and the open portion 54A of the branch pipe 36A on the left side in the vehicle width direction and the full-tank regulating valve 28 in the substantial center in the vehicle width direction are positioned in the liquid fuel.

In step S114 the control device 50 judges whether or not the angle of inclination θ of the fuel surface is greater than a threshold angle θA set beforehand. In a case where the control device 50 has judged that the angle of inclination θ is greater than the threshold angle θA (the state of the angle of inclination θ1 shown in FIG. 4A), the control device 50 moves to step S116.

In step S116 the control device 50 causes the rotor 46 of the rotating electromagnetic valve 42 to rotate so that its angle of rotation becomes the angle of rotation θ2. Because of this, as shown in FIG. 2(B) and FIG. 4B, the connecting hole 52A and the individual communicating hole 56A become communicated with each other. As indicated by arrows F2 in FIG. 4A, movement of the gas from the branch pipe 36A (the open portion 54A) via the rotating electromagnetic valve 42 to the common pipe 38 is possible. The connecting hole 52B and the individual communicating hole 56B are not communicated with each other, so movement of the fuel (liquid) from the branch pipe 36B (the open portion 54B) to the common pipe 38 is blocked.

In a case where the control device 50 has judged in step S114 that the angle of inclination θ of the fuel surface is equal to or less than the threshold angle θA, the control device 50 moves to step S118.

In step S118, the control device 50 judges whether or not the angle of inclination θ of the fuel is smaller than a threshold angle θB set beforehand. In a case where the control device 50 has judged that the angle of inclination θ is smaller than the threshold angle θB (the state of the angle of inclination θ2 shown in FIG. 5A), the control device 50 moves to step S120.

In step S120, the control device 50 causes the rotor 46 of the rotating electromagnetic valve 42 to rotate so that its angle of rotation becomes the angle of rotation α3. Because of this, as shown in FIG. 2(C) and FIG. 5B, the connecting hole 52B and the individual communicating hole 56B become communicated with each other. As indicated by arrows F3 in FIG. 5A, movement of the gas from the branch pipe 36B (the open portion 54B) via the rotating electromagnetic valve 42 to the common pipe 38 is possible. At the same time, the connecting hole 52A and the individual communicating hole 56A are not communicated with each other, so movement of the fuel (liquid) from the branch pipe 36A (the open portion 54A) to the common pipe 38 is blocked.

In a case where the control device 50 has judged in step S118 that the angle of inclination θ of the fuel surface is equal to or less than the threshold angle θB, the control device 50 ends the flow.

As will be understood from the above description, in the fuel tank system 12 of the present embodiment, there are plural open portions (branch pipes) inside the fuel tank 14. Additionally, the fuel inclination sensor 60 detects the angle of inclination θ of the fuel surface, and the open portions positioned in the gas layer inside the fuel tank 14 are communicated with the canister 32 to make it possible for the gas to move to the canister 32. Consequently, in a case where, for example, the internal pressure of the fuel tank 14 has become high, even if the fuel surface is inclined, some of the gas moves to the canister 32 so that an excessive increase in the internal pressure of the fuel tank 14 can be prevented.

At the same time, when the fuel surface is inclined, the path leading from the open portion positioned in the liquid fuel inside the fuel tank 14 to the canister 32 is closed, so the liquid fuel can be prevented from flowing to the canister 32.

Additionally, in the fuel tank system 12 of the present embodiment, the rotating electromagnetic valve 42 disposed outside the fuel tank 14 is used to prevent movement of the fuel from the open portions 54A and 54B to the canister 32. For this reason, it is not necessary to dispose valves having floats (float valves) in the open portions 54A and 54B for the same purpose.

Here, a structure where float valves are disposed in all the open portions of the branch pipes will be supposed as a comparative example. In the structure of the comparative example, when the fuel is inclined, the float valve in the fuel closes, so movement of the liquid fuel to the canister can be prevented.

However, in the structure of the comparative example, if all the floats become immersed in the fuel and the open portions end up becoming closed, the gas inside the fuel tank cannot be moved to the canister when the internal pressure of the fuel tank rises.

In order to prevent this kind of situation in the structure of the comparative example, it is necessary to set the fuel surface low so that at least one float is positioned in the gas layer. However, the float housing of the float valve has a certain extent of height in order to ensure an amount of movement of the float in the upward and downward direction. Consequently, in the structure of the comparative example, the fuel surface ends up being set lower than the float housing having the certain extent of height, and it is difficult to set the fuel surface high. In short, in the structure of the comparative example, the fuel surface becomes set low, and the effective capacity of the fuel tank 14 (the amount of fuel that the fuel tank 14 can actually hold) becomes reduced.

Moreover, in a structure where float valves are disposed in all the open portions of the branch pipes like in the comparative example, when the float of the float valve positioned in the liquid fuel when the fuel surface is inclined moves up and down due to vibration of the vehicle, for example, there is the concern that the float valve will end up becoming opened.

In contrast to this, in the fuel tank system 12 of the present embodiment, it is not necessary to dispose valves having floats in the open portions 54A and 54B, and the open portions 54A and 54B can be set, for example, in positions near the upper surface 14U of the fuel tank 14. Furthermore, it is also not necessary to set low the liquid level when the fuel is inclined so that a float valve does not become opened when the float in the float valve moves up and down. In this way, in the present embodiment, the height of the fuel surface when the fuel surface is inclined can be raised to a position near the open portions 54A and 54B, so a large effective capacity can be ensured for the fuel tank 14.

In the present embodiment, the full-tank regulating valve 28 is a valve having the float 28F. That is, when the fuel level reaches the full level FL, movement of the gas from the fuel tank 14 to the canister 32 can be prevented by the simple action of the float 28F floating on the fuel. For example, in a configuration where a liquid surface detection sensor detects the fuel surface and an electromagnetic valve or the like closes a vapor pipe when the liquid surface detection sensor has detected that the fuel level has reached a predetermined liquid level (full level), it is necessary to dispose an electromagnetic valve and to control the opening and closing of the electromagnetic valve. In contrast to this, in the present embodiment, a structure that can prevent movement of the gas from the fuel tank 14 to the canister 32 when the fuel tank 14 is full can be realized without having to detect, with a liquid level detection sensor or the like, that the level of the fuel inside the fuel tank 14 has reached the full level and having to control an electromagnetic valve.

The full-tank regulating valve 28 is disposed in a position in the center in the longitudinal direction of the fuel tank 14 when the fuel tank 14 is seen in a plan view. Consequently, even when the fuel tank 14 is inclined when refueling the fuel tank 14, the effects of this inclination can be reduced to reduce variations in the amount of fuel inside the fuel tank 14 when the fuel tank 14 is full.

Furthermore, if the full-tank regulating valve 28 is placed near an edge portion 14E of the fuel tank 14, it is necessary to set the liquid surface low to ensure that the full-tank regulating valve 28 is not in the fuel (liquid) even in a case where the fuel surface is inclined in such a way that there is a gas layer on the side of the full-tank regulating valve 28. By placing the full-tank regulating valve 28 in the center of the fuel tank 14 and ensuring that there is an open portion 54A (or 54B) near the edge portions 14E like in the present embodiment, movement of the gas from the gas layer to the canister 32 when the fuel surface is inclined can be ensured by means of the open portion. Additionally, there is no problem even when the full-tank regulating valve 28 placed in the center is in the fuel when the fuel is inclined (even when the full-tank regulating valve 28 is closed), and the position of the liquid surface is not affected by the full-tank regulating valve 28.

Additionally, valves having floats are not disposed in the open portions 54A and 54B of the branch pipes 36A and 36B. In this way, as long as there is a communicating pipe equipped with an open portion in which there is not a float valve, the liquid surface position when the fuel is inclined corresponding to the open portion in which there is not a float valve can be set high, and the effective capacity of the fuel tank 14 can also be increased.

Particularly in the present embodiment, the full-tank regulating valve 28 is disposed in a position near the center in the longitudinal direction, and the open portions 54A and 54B in which the full-tank regulating valve is not disposed are positioned on the edge portion sides in the longitudinal direction. For this reason, even when the fuel tank 14 is inclined when refueling the fuel tank 14, the effects of this inclination of the fuel tank 14 can be reduced and it is possible for the full-tank regulating valve 28 to be closed (for the float 28F to float on the fuel) by a predetermined refueling amount.

The common pipe 38, which is part of the communicating pipe 30, doubles as the part of the vapor pipe 36C (the section from the rotating electromagnetic valve 42 to the canister 32) that communicates the full-tank regulating valve 28 to the canister 32. Consequently, compared to a structure where the vapor pipe 36 is disposed completely separately from the communicating pipe 30, this can contribute to a reduction in weight and a reduction in the number of parts.

In the above embodiment, a structure having the plural (two) branch pipes 36A and 36B and the one common pipe 38 is described as an example of the communicating pipe 30. In this structure, the part of the communicating pipe 30 from the open portions 54A and 54B to the canister 32 is shared in common by the common pipe 38, so the number of parts can be reduced, which can contribute to a simplification of the structure and a reduction in weight.

Furthermore, in the above embodiment, the one rotating electromagnetic valve 42 is disposed in the branch portion 30B of the communicating pipe 30 at which the common pipe 38 branches into the branch pipes 36A and 36B. Consequently, compared to a structure where a valve is disposed in each of the branch pipes 36A and 36B, the number of parts can be reduced, which can contribute to a simplification of the structure and a reduction in weight.

Moreover, the rotating electromagnetic valve 42 has the rotor 46, and by simply adjusting the angle of rotation of the rotor 46, the common pipe 38 can be communicated to either of the two branch pipes 36A and 36B. It suffices to control the angle of rotation of the one rotor 46, and it is not necessary to control plural opening and closing valves, so control is easy.

The number of the open portions is not limited to the two described above, and the number of the communicating pipes (branch pipes) is also not limited to two. That is, three or more communicating pipes (branch pipes), each equipped with an open portion positioned higher than the full level FL, may also be disposed inside the fuel tank 14. In a structure equipped with three or more branch pipes, it is also possible to communicate the communicating pipe to plural (not limited to one) branch pipes and also discommunicate the communicating pipe from the other branch pipes by engineering the internal structure of the electromagnetic valve and the control method.

Furthermore, a structure having two open portions positioned apart from each other in the vehicle width direction was described, but the open portions may also be positioned apart from each other in the vehicle forward and rearward direction, for example. In this case, the communicating pipes corresponding to the open portions can be opened and closed in correspondence to a case where the fuel surface is inclined in the vehicle forward and rearward direction.

Particularly in a structure having three or more open portions, it is also possible, for example, to arrange the open portions so that they correspond to inclinations of the fuel surface in the two directions of the vehicle width direction and the vehicle forward and rearward direction.

In the above embodiment, a structure having the vehicle angle-of-inclination sensor 62 and the acceleration sensor 64 was described as the fuel inclination sensor, but the fuel inclination sensor is not limited to these. For example, electrostatic capacitance sensors whose electrostatic capacitance changes in accordance with their state of contact with the fuel may be placed in plural places inside the fuel tank 14, and the state of inclination of the fuel surface may be detected from the values of the electrostatic capacitance of the electrostatic capacitance sensors. However, in a structure using electrostatic capacitance sensors, the electrostatic capacitance sensors are located inside the fuel tank 14, so this is disadvantageous in terms of ensuring a large effective capacity for the fuel tank 14. In contrast to this, the vehicle angle-of-inclination sensor 62 and the acceleration sensor 64 used in the present embodiment are located outside the fuel tank 14, so this is advantageous in terms of ensuring a large effective capacity for the fuel tank 14. Moreover, by doubly using, in the fuel tank system 12 of the present embodiment, the vehicle angle-of-inclination sensor 62 and the acceleration sensor 64 that are already installed beforehand in the vehicle, the addition of new sensors is unnecessary, which can contribute to a reduction in weight and a reduction in cost.

The present application makes it possible for the gas to move from the fuel tank to the canister when the fuel surface in the fuel tank is inclined, and can ensure a large effective capacity for the fuel tank.

The disclosure of Japanese Patent Application No. 2015-235195, filed on Dec. 1, 2015, is incorporated in its entirety herein by reference.

All documents, patent applications, and technical standards mentioned in this specification are incorporated herein by reference to the same extent as if each individual document, patent application, or technical standard were specifically and individually indicated to be incorporated by reference.

What is claimed is:

1. A fuel tank system comprising:
a fuel tank configured to hold fuel;
a canister configured to adsorb fuel vapor;
a communicating pipe including a common pipe shared in common on a canister side and a plurality of branch pipes branching from a branch portion outside the fuel tank to a fuel tank side, the communicating pipe having a plurality of open portions disposed in the plurality of branch pipes and positioned higher than a full level inside the fuel tank, and the communicating pipe communicating between the inside of the fuel tank and the canister;
a fuel inclination sensor that detects a state of inclination of a fuel surface with respect to the fuel tank; and
a valve member that is disposed in the branch portion, the valve member including a rotating valve that communicates the common pipe with at least one branch pipe of the plurality of branch pipes based on an angle of rotation of the rotating valve, and, based on the detected state of inclination, the valve member closes the communicating pipe corresponding to an open portion among the plurality of open portions, which is predicted to be positioned in the fuel, and the valve member opens the communicating pipe corresponding to an open portion predicted to be positioned in a gas layer section of the fuel tank, by rotating the rotating valve.

2. The fuel tank system according to claim 1, further comprising:
a vapor pipe including, in a center in a longitudinal direction of the fuel tank as seen in a plan view of the fuel tank, a vapor outlet positioned higher than the full level inside the fuel tank, the vapor pipe communicating the inside of the fuel tank with the canister; and
a full-tank regulating valve disposed in the vapor outlet, the full-tank regulating valve closing the vapor outlet by using a float floating on the fuel inside the fuel tank.

3. The fuel tank system according to claim 2, wherein the plurality of open portions are positioned on edge portion sides of the fuel tank relative to the vapor outlet as seen in the plan view of the fuel tank.

4. The fuel tank system according to claim 3, wherein the common pipe also functions as the vapor pipe on the canister side.

5. The fuel tank system according to claim 4, wherein the valve member includes:
a control device configured to rotate the rotating valve at predetermined angles based on the state of inclination of the fuel surface detected by the fuel inclination sensor such that communicating holes communicate the common pipe with the at least one branch pipe of the plurality of branch pipes.

6. The fuel tank system according to claim 5, wherein the rotating valve communicates the common pipe with the vapor pipe on a fuel tank side in accordance with the angle of rotation of the rotating valve.

7. The fuel tank system according to claim 6, wherein the rotating valve includes:
a rotor housing; and
a rotor disposed inside the rotor housing, the rotor communicating the common pipe to any branch pipe of the plurality of branch pipes on the fuel tank side based on the angle of rotation of the rotating valve.

8. The fuel tank system according to claim 7, further comprising:
a plurality of connecting holes connected to the plurality of branch pipes, and a common connecting hole, to which the common pipe is connected, are formed in the rotor housing;
a plurality of individual communicating holes that communicate with any one of the plurality of connecting holes based on the angle of rotation of the rotor; and
a common communicating hole with which the individual communicating holes merge, the common communicating hole communicating with the common connecting hole regardless of the angle of rotation of the rotor, the plurality of individual communicating holes and the common communicating hole being formed in the rotor.

9. The fuel tank system according to claim 1, wherein the fuel inclination sensor includes:
a vehicle angle-of-inclination sensor configured to detect an angle of inclination of a vehicle in which the fuel tank is installed; and an acceleration sensor configured to detect an acceleration of the vehicle.

\* \* \* \* \*